United States Patent [19]

Nishino et al.

[11] 4,350,613
[45] Sep. 21, 1982

[54] CATALYST FOR PURIFYING EXHAUST GASES AND METHOD FOR MANUFACTURING SAME

[75] Inventors: Atsushi Nishino, Neyagawa; Kunio Kimura, Hirakata; Kazunori Sonetaka, Hirakata; Yasuhiro Takeuchi, Hirakata, all of Japan

[73] Assignee: Matsushita Electric Industrial Company, Limited, Osaka, Japan

[21] Appl. No.: 242,176

[22] Filed: Mar. 10, 1981

[30] Foreign Application Priority Data

Mar. 11, 1980 [JP] Japan .................................. 55-31186
Mar. 11, 1980 [JP] Japan .................................. 55-31187
Jul. 24, 1980 [JP] Japan ................................. 55-102155

[51] Int. Cl.$^3$ ........................ B01J 21/04; B01J 21/06; B01J 23/58; B01J 23/64
[52] U.S. Cl. ................................ 252/455 R; 252/457; 252/462; 252/463; 252/464; 252/465; 252/466 PT; 252/466 J; 252/466 B; 423/247

[58] Field of Search .................. 252/455 R, 457, 462, 252/463, 464, 465, 466 PT, 466 J, 466 B; 423/247

[56] References Cited

U.S. PATENT DOCUMENTS 3,905,917  9/1975  Nishino et al. ................. 252/463 X
4,065,406 12/1977  Nishino et al. .................... 252/466 J
4,211,672  7/1980  Sonetaka et al. ............... 252/455 R Primary Examiner—W. J. Shine
Attorney, Agent, or Firm—Lowe, King, Price & Becker

[57] ABSTRACT

A catalyst for purifying an exhaust gas comprising a carrier substantially composed of calcium aluminate and titanium oxide. The carrier is deposited with a platinum group metal or a metal oxide capable of oxidizing reductive gases into innoxious ones. The titanium oxide is applied on the surface of the carrier or incorporated in the carrier. The carrier may further comprise a transition metal oxide showing catalytic activity. A method of making a catalyst is also disclosed in which titanium oxide is applied on the surface of a solid mass of calcium aluminate.

18 Claims, No Drawings

CATALYST FOR PURIFYING EXHAUST GASES AND METHOD FOR MANUFACTURING SAME

This invention relates to a catalyst for purifying exhaust gases generated from various burning or cooking appliances by oxidation of carbon monoxide and/or hydrocarbons contained in the exhaust gases into innoxious gases. Also, it relates to a method for making the catalyst of the type just mentioned.

Recently, owing to increased air tightness in housing or building, it is required to purify exhaust gases from various burning devices or heaters. For instance, petroleum stoves or heaters have been sold commercially provided with catalysts therein or table roasters in which catalysts are set in position to eliminate oil and smoke generated during cooking. It is the general practice that catalysts have been employed under control of a technical expert; however, as is apparently seen from the above instances, it is a recent trend that ordinary consumers make use of a catalyst positively. The requirements for a catalyst to be used by ordinary users can be summarized as follows.

(1) Inexpensive.
(2) Harmless.
(3) Long lifetime.
(4) No side reactions involved.
(5) Solidity and firmness.
(6) Moldability in any desired form.

As catalysts which meet the above requirements, we have proposed catalysts which comprise a binder or carrier made of calcium aluminate and manganese oxide or copper oxide supported on the carrier with or without being further supported with platinum group metals (U.S. Pat. Nos. 3,905,917, 4,065,406 and 4,211,672). The catalyst using calcium alumina as a base material can satisfy the above requirements to a certain extent but is not necessarily satifactory from the viewpoint of long life. As a matter of course, proper control of the amount of a catalyst to be supported or application of conditions will ensure long life but is accompanied by problems such as high price and limitation in the range of use. For example, a catalyst using calcium aluminate as a base material shows a tendency to deteriorate when applied under relatively high temperature conditions, such as by sintering of calcium aluminate, reduction of the specific surface area caused by aggregation of a supported metal or metal oxide or poisoning with $SO_2$ gas.

Hitherto, alumina has been widely used as a carrier for catalysts. Further, there is known a carrier of a specific construction in which a monolithic molding of a honey-comb structure made of a cordierite mineral is applied with a $\gamma$-$Al_2O_3$ layer thereon. Moreover, diatomaceous earth or magnesia has been applied as a carrier. However, these materials do not overcome the drawbacks described above.

For instance, $\gamma$-$Al_2O_3$ is considered to be excellent as a carrier for catalysts, because it exhibis a large surface area and good dispersibility of catalyst. It is thus one of the most widely used carriers. However, a drawback in the use of $\gamma$-$Al_2O_3$ is that it is so low in heat resistance that when employed at high temperatures, the compound is sintered which reduces its specific surface area and is converted into a more stable $\alpha$-$Al_2O_3$. On the other hand, according to recent studies on the mechanism of deterioration of Pt catalyst, the following theories of metal particles have been reported.

(1) A mechanism in which one or several atoms separate from metal particles and move along the surface of the carrier (atom-moving theory).

(2) A mechanism in which entire particles of the metal move along the carrier surface by intermetallic action while overcoming a strong interaction between the carrier and metal (particle moving theory).

(3) A mechanism in which platinum changes into atoms or molecules and moves in a gas phase or on the carrier.

In any of these theories, the metal catalyst on the carrier gradually aggregates or gathers and thus the specific surface area is reduced with attendant lowering of its activity. The carrier which serves to expedite the growth of metal particles includes, aside from $\gamma$-$Al_2O_3$ or $ZrO_2$, calcium aluminate which we have proposed for use as a carrier for the platinum group metals.

In contrast thereto, titanium oxide or barium oxide has attached special interest recently as a carrier which hardly causes the growth of metal particles thereon. The reason why these materials show the growth-suppressing effect is not known at the present stage of investigation but it is a fact that a catalyst using particularly titanium oxide as a carrier does not involve the growth of metal particles thereon, is stable in heat resistanc and has a long life. In addition, titanium oxide is excellent in resistance to $SO_2$ poisoning and is thus a favorable material for a catalyst for purifying exhaust gas.

It is considered convenient to prepare a carrier from titanium oxide but titanium oxide has the drawback that it is difficult to mold monolithically and because its high melting point of above 1800° C., so that even though the molding is obtained, the specific surface area is so small that the molding becomes inactive as a carrier. Thus, although titanium oxide is recognized to be effective as a carrier, it involves difficulties in practical application.

It is therefore an object of the present invention to provid a catalyst for purifying exhaust gases which overcomes the prior art difficulties or problems described above.

It is another object of the invention to provide a catalyst of the just-mentioned type which comprises titanium oxide as one of carrier components which imparts the excellent characteristic properties of titanium oxide to the catalyst.

It is a further object of the invention to provide a catalyst for oxidizing reducing gases such as carbon monoxide and/or hydrocarbons into innoxious gases under relatively high temperature conditions, which catalyst is excellent in heat resistance and has a long life.

It is a still further object of the invention to provide a catalyst which involves little thermal deterioration over a long period even when applied at high temperatures.

It is another object of the invention to provide a method for making a catalyst of the just-mentioned type.

In a broad aspect of the invention, there is provided a catalyst which comprises a carrier substantially composed of calcium aluminate and 5 to 90 wt% of titanium oxide based on the carrier, and a catalytic component of a platinum group metal or a metal oxide capable of oxidizing reductive gases into innoxious gases and supported on the carrier in an amount of 0.001 to 0.1 wt% of the carrier when the platinum group metal is used, and in an amount of 0.1 to 10 wt% when the metal oxide is used. In the catalyst of this arrangement, the carrier itself shows little or no catalytic activity and the catalytic performance depends on the type of supported catalyst. However, because of excellent resistance to heat and poisoning of $TiO_2$, the amount of the catalytic component to be supported is very small. The amount of titanium oxide is in the range of 5 to 90 wt% as defined above. Smaller amounts are unfavorable since the effect of addition of the titanium oxide is not achieved. On the contrary, larger amounts result in a reduced amount of calcium aluminate and as a consequence, the carrier becomes so weak in its binding force that it can not stand use.

In another aspect, there is provided a catalyst in which the carrier further comprises a transition metal oxide, i.e. the carrier is substantially composed of 10 to 70 wt% of calcium aluminate, 5 to 50 wt% of titanium oxide and 5 to 70 wt% of a transition metal oxide. Most of transition metal oxides show high catalytic activity and have been long used as a hopcalite catalyst. This catalyst is characterized by its high activity at low temperatures but has a drawback that it suffers thermal deterioration to a great degree and is poor in resistance to poisoning. This is partly due to the fact that transition metal oxides are thermally unstable and can readily be converted into lower oxides and partly due to the fact that active sites disappear or the specific surface area is reduced owing to sintering thereof. This sintering becomes considerable especially when particles of the oxide come close to one another. We have succeeded in preventing the occurrence of the sintering to some extent by binding the particles of the metal oxide with calcium aluminate. However, there arises a problem in that CaO of the calcium aluminate reacts with the metal oxide to form, for example, $CaMn_2O_4$ thereby lowering the activity of the oxide. This problem is overcome in accordance with the invention by incorporating titanium oxide in the mixture of calcium aluminate and a transition metal oxide. That is, titanium oxide which has excellent resistance to heat and poisoning is admixed with calcium aluminate and a transition metal to form a barrier layer between particles of the metal oxide thereby preventing occurrence of the sintering. Furthermore, it has been found that the metal oxide itself does not suffer from sulfur poisoning because of the influence of titanium oxide which is resistant to sulfur poisoning. The reason for this is that a sulfur compound is first attracted by calcium aluminate and is diffused into the inside of a carrier by which the metal oxide is poisoned, but the barrier layer of titanium oxide protects the metal oxide from the sulfur compound.

As described above, a catalyst composed of a mixture of calcium aluminate, a transition metal oxide and titanium oxide shows a catalytic activity which is to some extent differently from the first-mentioned catalyst, but is unsatisfactory for use as a catalyst. Accordingly, it is convenient that this carrier be further supported or deposited with a catalytic metal or metal oxide on the surface thereof. In the case, a more excellent catalytic performance can be attained by the synergistic effect of a transition metal oxide and the catalytic metal or metal oxide.

In accordance with a further aspect of the invention, a carrier of the first-mentioned type is made of a solid mass or core of calcium aluminate and a titanium oxide layer is formed on part or all of the surface of the mass, the amount of the titanium oxide being controlled so as to be in the range of 0.05 to 10 wt% of the solid mass. By this, the catalyst becomes more stable and long lived and more excellent in resistance to $SO_2$ poisoning without causing growth of catalytic particles on the carrier surface. This type of catalyst is very advantageous in that calcium aluminate can be molded in any desired form and titanium oxide having excellent properties as a carrier can be readily applied as a layer on the molded mass or core. The covering layer of titanium oxide is tenaceous and satisfactory in bonding strength even when treated at temperatures below 800° C.

This type of catalyst can be prepared by a method which comprises providing a mass of calcium aluminate, applying a slurry of titanium oxide or a solution of a titanium compound on the mass, thermally treating the thus applied mass at temperatures above 500° C. to form a titanium oxide layer on part or all of the surface of the mass thereby obtaining a carrier, and depositing on the carrier a platinum group metal or a metal oxide capable of oxidizing reductive gases into innoxious gases in an amount of 0.001 to 0.1 wt% based on the carrier when the metal is used and in an amount of 0.1 to 10 wt% when the metal oxide is used.

The present invention will now be described in more detail.

Calcium aluminate which is used as a binder for a carrier or a carrier core in the practice of the invention is typically alumina cement of high heat resistance, which is distinct from Portland cement. Alumina cement is generally represented by $mAl_2O_3 \cdot nCaO$ while Portland cement is represented by $m'SiO_2 \cdot n'CaO$. Although large in demand and low in cost, Portland cement has drawbacks that it is poor in heat and spalling resistances and low in speed of hardening and it is subject to be attacked by sulfate ions. In contrast, alumina cement is excellent in heat resistance and high in hardening speed and is thus preferable from the viewpoint of catalyst prepartation.

The alumina cement has the composition indicated above and when the CaO component exceeds 40 wt%, its heat resistance becomes poorer altnough mechanical strengths increase, coupled with another disadvantage that such alumina cement readily reacts with a heavy metal oxide at high temperatures, e.g. it reacts with manganese oxide at temperatures of 650° C. or more to form $CaMn_2O_4$, thus giving rise to the thermal breakage of catalyst. On the other hand, lower contents of the CaO component result in improved heat resistance but in decreased mechanical strengths so that prolonged aging time is required at the time of molding, thus leading to a reduction in productivity. Additionally, when the content of the alumina component is below 35 wt%, the heat resistance is lowered. On the other hand, larger contents of the alumina component can improve that heat resistance.

When an iron oxide component to be incorporated in the alumina cement exceed 20 wt%, mechanical strengths under heating conditions are lowered with the attendant lowering of the heat resistance. The iron oxide exhibits catalytic activity for purifying gases such as, for example, carbon monoxide, at temperatures higher than about 300° C. In order to develop such a promoting effect, it is preferable that iron oxide is contained in an amount of 2 wt% or more.

Preferable compositions of the alumina cement are comprised of 15 to 40 wt%, prefereably 30 to 40 wt%, of the CaO component, 35 to 80 wt%, preferably 40 to 60 wt%, of the alumina component and 0.3 to 20 wt%, preferably 2 to 10 wt% of the iron oxide component.

When the calcium aluminate is used in admixture with titanium oxide, its content is 10 to 95 wt% of the total of calcium aluminate and titanium oxide. Further, when a transition metal is also incorporated in the calcium aluminate and titanium oxide, the content of calcium aluminate is in the range 10 to 70 wt% so as to impart a satisfactory binding strength to the article formed from the mixture of these three components.

As described hereinbefore, Portland cement is poor in heat resistance and can not withstand temperatures higher than 300° C. and thus is not suitable for the gas purification purpose of household burning appliances in which temperatures of the catalyst are likely to exeed approximately 300° C. Although the alumina cement can satisfactorily withstand temperatures higher than 300° C., it is preferable that when a catalyst is allowed to withstand temperatures higher than 700° C., high alumina cement is employed.

The titanium oxide, which is an essential component of the carrier will now be described. In the practice of the invention titanium oxide is intended to mean not only simple metal oxides but also compound oxides containing titanium oxide. Titanium oxides include $Ti_2O$, $TiO$, $Ti_2O_3$, $Ti_3O_5$ and $TiO_2$, of which $TiO_2$ is the most stable and is preferred. $TiO_2$ includes crystal modifications called anatase, bookite and rutile. All of the three modifications naturally occur or can be artificially prepared. Of these, the rutile compound is stable even at high temperatures and the temeprature at which the conversion of an anatase into rutile structure takes place is about 700° C. In practice, any type of $TiO_2$ may be used, of which the rutile compound showing excellent heat stability is preferably used.

On the other hand, examples of compound oxides of titanium oxide include $TiO_2$-$ZrO_2$, $TiO_2$-$SiO_2$, $TiO_2$-$MgO$, $TiO_2$-$Bi_2O_3$, $TiO_2$-$CdO$, $TiO_2$-$SnO_2$ and the like, which are within the scope of the present invention.

$TiO_2$ of the rutile structure has a tetragonal crystal structure and a melting point of 1855° C. Naturally occurring $TiO_2$ has a specific surface area of about 10 $m^2/g$. It is believed that, while not as high in the specific surface area, the compound has such a high melting point that the reduction of the surface area by sintering or the growth of particles of a metal catalyst can be suppressed in the ususal manner of application.

$TiO_2$ partially reacts with calcium aluminate and thus shows high bonding force. In addition, $TiO_2$ itself is high in mechanical strength. Accordingly, it is possible to form a carrier which is much better than prior art counterparts.

When the titanium oxide is used in admixture with calcium aluminate, its content should be in the range of 5 wt% to 90 wt% for the reason described hereinbefore.

As described hereinbefore, the titanium oxide may be applied as a layer on a solid mass or core made of calcium aluminate. The procedure for formation of the titanium oxide layer will now be described.

In order to form the titanium oxide layer on the solid mass, it is convenient to use a slurry of $TiO_2$ which is readily available. This slurry is commercially sold and is merely applied onto or immersed with the solid mass and subsequently heat treated to form a layer of $TiO_2$. Alternatively, $TiOSO_4$ or $(NH)_2TiCl_6\cdot 2H_2O$ which is soluble in water, may be used in the form of an aqueous solution. Further, titanium can form salts in combination with various organic materials and solutions of these salts may be used. Examples of the organic salts which are relatively readily available are titanium lactate expressed by the formula

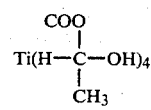

These solutions may be applied in a similar manner to the slurry, i.e. either the solution or slurry is applied to the solid mass of calcium aluminate by the coating or immersing technique. Then, the applied mass is dried and cured or sintered at a predetermined temperature thereby depositing a $TiO_2$ layer on the solid mass. In this manner, the titanium oxide layer can be deposited on part or all of the surface of the solid mass of calcium aluminate. Since the deposition is limited only to the surface area, the titanium oxide used is very small amounts. Nevertherless, the excellent properties of titanium oxide can be imparted to the carrier and the carrier may be shaped in any desired form because the core is made of calcium aluminate which is readily moldable. The effective amount of titanium oxide to be deposited or formed as a layer is in the range of 0.05 to 10 wt% based on the solid mass. Less amounts can not reflect the purpose of the invention while larger amounts are unfavorable since the bonding force to the calcium aluminate mass becomes weak and thus a tenacious titanium oxide layer can not be formed.

Then, the thermal treatment of the deposited titanium oxide layer is described. The heat treating conditions are important so as to determine the crystal form of $TiO_2$ and increase the bonding force to the calcium aluminate mass. In order to form a thermally stable $TiO_2$ layer, it is necessary to heat at temperatures above 700° C. but where such a high temperature is not used in practical applications of catalyst, the heat treatment at 500° to 700° C. is sufficient. However, the heat treatment at temperature below 500° C. is not favorable since $TiO_2$ may not be completely deposited and its bonding force to calcium aluminate does not reach a satisfactory level. The carrier of this type, in which a $TiO_2$ layer is formed on part or all of the surface of calcium aluminate mass, is preferable to that made of a mixture of calcium aluminate and titanium oxide for the reason that excellent properties of titanium oxide are effectively reflected on the carrier.

The transition metal oxide is now described. The transition metal oxides include oxides of a metal selected from Mn, Co, Ni, Cr, Cu and Fe. The transition metal oxides used herein mean at least one metal oxide mentioned above or a compound oxide containing the above metal oxide as one component. Of these transition metal oxides, manganese oxide is most preferable. The manganese oxide is a main component constituting the hopcalite catalyst and is ralatively high in catalytic activity. The manganese oxide involves various types of crystal modification, of which $\gamma$-$MnO_2$ prepared from electrolysis is preferable for the purpose of the invention.

Simple metal oxides are high in activity but in view of heat stability, compound oxides are preferable. Various compound oxides are usable including, for example, $MnFe_2O_4$, $ZnFe_2O_4$, $CoFe_2O_4$, $BaFe_2O_4$ and the like. These compound oxides may be used singly or in combination with the simple metal oxides.

The amount of the transition metal oxide shows a close relation to an improved characteristic of catalytic performance and is necessary to be in the range of at least 5 wt% of the mixture of calcium aluminate, titanium oxide and the transition metal oxide. Less amounts are unfavorable since the effect of the addition can not be expected, whereas amounts larger than 70 wt% are also unfavorable since mechanical strengths of the catalyst are lowered and particles of the metal oxide naturally come too close to one another and thus the effect of titanium oxide can not be expected. For the reason described above, an optimum range is 5 to 70 wt% of the mixture.

Three types of carriers have been described above including one type in which a mixture of calcium aluminate and titanium oxide is used, another type in which a solid mass of calcium aluminate is coated with titanium oxide on part or all of the surface of the solid mass, and a further type using a mixture of calcium aluminate, titanium oxide and a transition metal oxide.

These types of carriers may be used satisfactorily as they are. In order to increase mechanical strengths, deflective strength and resistance against thermal destruction or breakage, heat-resistant aggregates may be added. Examples of heat-resistant aggregates include silica aggregates, silica-alumina aggregates, alumina aggregates, and mixtures thereof and, in the mineral phase, it is preferable to employ silica minerals, millite, corundum, silimanite, $\beta$-alumina, and minerals of magnesia, chrome, dolomite, magnesite-chrome and chrome-magnesite. Moreover, it is preferable to use ordinary particulate or granular aggregates at low temperatures (300° to 700° C.) and heat-resistant granular aggregates at high temperatures (above 700° C.) depending on the working temperature of the catalyst.

More particularly, the silica aggregates include siliceous stone and are mainly composed of $SiO_2$. The silica-alumina aggregates include chamotte, agalmatolite, high alumina and the like, in which $SiO_2$-$Al_2O_3$ is a main component. The alumina aggregates include $\alpha$-$Al_2O_3$, $\beta$-$Al_2O_3$, $\gamma$-$Al_2O_3$, $\rho$-$Al_2O_3$ and the like. As ordinarily employed minerals, there may be mentioned silicate minerals, mullite, corundum, silimanite, $\beta$-alumina and the like. In practice, materials obtained by roughly crushing the above-mentioned aggregates to some extent or commercially available aggregates of coinchalcite, siliceous sand, alumina, chamotte and the like may be used, and for general purpose it is convenient to employ siliceous sand or chamotte commercially sold on the market.

In order to improve the heat resistance of the carrier, there may be optionally added alkali-resistant glass fibers, fibrous iron wires, silica-alumina fibers, asbestos, or mixtures thereof and the like.

Further, the molding of a carrier is feasible more easily by adding as a molding aid such as carboxylmethyl cellulose, methyl cellulose, polyvinyl alcohol, alcohols, and clay minerals such as bentonite.

Catalytic components to be supported or deposited on the carrier constituted of the afore-described compositions are described.

Catalytic components to be supported are those which are capable of oxidizing reductive gases such as carbon monoxide and hydrocarbons into innoxious gases, are mainly platinum group metals which include platinum, palladium, ruthenium, rhodium, and iridium. In practice, these metals are applied in the form of salts, of which chlorides are preferable. Typical salts include tetrachloroplatinate $H_2PtCl_4$, hexachloroplatinate $H_2PtCl_6$, platinum diaminodinitrile $Pt(NH_3)_2(NO_2)_2$, palladium chloride $PdCl_2$, ruthenium chloride $RuCl_3$, and rhodium chloride. These metal salts are used by being dissolved in a solvent such as water or an alcohol. The concentration may vary depending on the amount or manner of deposition but use of a very concentrated solution results in poor dispersability of catalytic particles. Therefore, an optimum concentration should be determined depending on the purpose and end use and shape of the carrier.

Especially when the platinum group metals are employed, there can be obtained a catalyst which is better both in initial performance and in catalyst life as compared with known platinum catalysts even when the deposition amount is in the range of as small as 0.001 to 0.1 wt% of the carrier. That is, known platinum catalysts make use of a carrier such as alumina or cordierite and platinum is usually deposited in an amount of 0.5 to 0.1 wt%. Amounts of less than 0.1 wt% involve a very deteriorated catalyst life and thus it is generally accepted in the above-indicated range of the deposition amount should be used. On the other hand, when the carrier for the catalyst of the invention is used, high catalytic performance can be expected even when the amount of deposited platinum is very small.

Thus, when any type of carrier in accordance with the invention is used, a catalyst of high performance can be obtained using only a very small amount of platinum group metals. This is believed to occur for the reason that part of the calcium aluminate constituting the carrier absorbs moisture, in which $Al_2O_3$·$nCaO$ is partially dissolved to release part of Cao and the solution thus shows alkalinity. On the other hand, a starting material for a noble metal catalyst is in most cases in the form of a chloride such as, for example, $RuCl_3$, $RhCl_3$, $PdCl_2$, $H_2PtCl_4$, or $H_2PtCl_6$. When the hexachloroplatinate is dissolved in water, $PtCl_6^{2-}$ ions are released and react with the dissolved CaO to form $PtCl_6(OH)$. This $PtCl_6(OH)$ salt is formed on or around the surface of the carrier and does not descend to the depth of the pores. Accordingly, the catalytic metal of the invention is distributed chiefly on the surface of the carrier and does not diffuse into the inside of the carrier. As described above, the catalytic metal ions are converted into a corresponding hydroxide on the carrier surface and attached also to $TiO_2$ as they are. Further, the carrier is alkaline in nature, so that a compound is formed by a reaction between the catalytic metal anions and part of the carrier surface and thus the catalytic metal is fixedly deposited on the carrier.

Thus, the catalytic component can be deposited only on the surface layer of the carrier, with the result that there can be obtained a catalyst of high performance even when the deposited amount is very small.

Aside from the platinum group metals, there may be supported as a catalytic component oxides of iron, cobalt and nickel which are iron family elements, chromium and molybdenum which are chromium family elements, tin and lead which are carbon family elements, manganese which is a manganese family element, lanthanum which is a rare earth metal, zinc and cadmium which are zinc family elements, and vanadium which is a vanadium family element. Of these, metals such as Pt, Pd, Mn, Fe, Cu or Ag or an oxide thereof are preferable in consideration of environmental pollution, and most preferably Pt is used. These catalytic metals and metal oxides may be used singly or in combination.

There is a close relation between the amount of deposited catalytic component and the performance. In general, a greater amount of deposited catalyst results in more improved performance. Too great an amount will cause problems such as falling-off and partial distribution of the catalytic component. Independently of the amount of catalytic component, the ranges of application, shape, activity at low temperatures and life of the catalyst can be improved by applying two or more catalytic metals or metal oxides on the carrier.

An optimum amount of the catalytic metal oxide is in the range of 0.1 to 10 wt% of the carrier. The metal oxide is lower in activity as compared with noble metals such as platinum and is necessary to be used in a larger amount. With less amounts than 0.1 wt%, satisfactory catalytic activity can not be expected, whereas larger amounts than 10 wt% will cause a problem that the catalytic component may be fall off. In the practice of the invention, catalytic metal oxide and noble metal may be used in combination, in which case a total amount of the catalytic components is in the range of 0.1 to 10 Wt% provided that the noble metal is used within the range defined hereinbefore.

The metal oxide can be supported on a carrier similarly to the case of the noble metal by applying an aqueous solution of salts such as a nitrate, chloride and the like onto the carrier or immersing the carrier in the solution. In cases where metal oxide and metal catalytic components are allowed to coexist, a mixture of two solutions of corresponding metal salts may be used but it is preferable that the metal oxide is first supported, and the metal component is subsequently applied.

The present invention will be illustrated by way of examples.

EXAMPLE 1

Calcium aluminate (alumina cement), titanium oxide of the rutile structure and siliceous sand serving as a heat-resistant aggregate were mixed in such ratios as indicated in Table 1 to obtain compositions of different formulations. Each mixture was further admixed by a wet process with 30 to 40 part by weight of water, 4 parts by weight of an alkali-resistant glass fiber and 0.5 parts by weight of methyl cellulose, each based on 100 parts by weight of the mixture and then press molded. The molding was dried, aged in a water bath of 90° C. and then dried to obtain a sample carrier. This carrier was in the form of a disc of a honey-comb structure having a diameter of 154 mm and a thickness of 15 mm and provided with 745 through-holes having a diameter of 4.1 mm.

Platinum was used as a catalytic metal, i.e. an aqueous solution of chloroplatinate having a concentration of 1 g/100 cc was applied to a carrier in an amount of 70 mg (0.028 wt%) calculated as platinum, dried and thermally treated at 500° C. for 1 hour to deposit platinum on the carrier.

The performance of each catalyst thus obtained was determined to measure its CO purification rate under conditions of a space velocity of 10,000 hr$^{-1}$, a CO concentration of 300 ppm and an atmospheric temperature of 200° C. The heat resistance of each sample was determined by comparing the catalytic performances obtained after heating of the sample at 500° C. for 1 hour and after heating at 700° C. for 50 hours. The test results are shown in Table 1.

TABLE 1

| Test No. | Composition of Carrier (wt %) | | | CO Purification Rate (200° C., SV 10,000 hr$^{-1}$) | |
|---|---|---|---|---|---|
| | alumina cement | TiO$_2$ | SiO$_2$ | after heat treatment at 500° C. for hour | after heat treatment at 700° C. for hours |
| 1 | 50 | — | 50 | 100% | 72% |
| 2 | 70 | 3 | 27 | 100% | 73% |
| 3 | 70 | 5 | 25 | 100% | 94% |
| 4 | 70 | 10 | 20 | 100% | 98% |
| 5 | 50 | 30 | 20 | 100% | 100% |
| 6 | 40 | 50 | 10 | 100% | 100% |
| 7 | 20 | 70 | 10 | 100% | 100% |
| 8 | 10 | 90 | — | 100% | 100% |
| 9 | 5 | 95 | — | Impossible to mold | |

As is clearly seen from the above results, the effect of TiO$_2$ appears when the TiO$_2$ content in the carrier is in the range of 5 to 90 wt%. When the content exceeds 90 wt%, the molding is not effective since the alumina cement becomes too small in amount.

In this example, the test Nos. 1, 2 and 9 are shown for reference only.

EXAMPLE 2

The procedure of test No. 6 of Example 1 was repeated using TiO$_2$ of the anatase structure, with the results that the catalytic performance was 100% after heat treatment at 500° C. and 96% after heat treatment at 700° C.

EXAMPLE 3

The procedure of Example 1 using the composition of test No. 5 in which TiO$_2$ was replaced by compound oxides including TiO$_2$-ZrO$_2$, TiO$_2$-SiO$_2$ and TiO$_2$-MgO was repeated. As a result, it was found the CO purification rates after heat treatment at 500° C. were 100% for all the catalysts and those after heat treatment at 700° C. were 98%, 100% and 100%, respectively.

EXAMPLE 4

The carrier of the composition indicated by test No. 5 of Example 1 was used and applied with platinum in different ratios to show a relation between the deposited amount and the catalytic performance. Pt(NH$_3$)$_2$(NO$_2$)$_2$ was used as a starting material for platinum. That is, 1 g of the salt was dissolved in 100 cc of water and applied onto the carrier in amounts indicated in Table 2 (weight by percent after drying). The performance was evaluated in the same manner as in Example 1.

TABLE 2

| No. | Deposition amount of Pt (wt %) | CO Purification Rate | |
|---|---|---|---|
| | | after heat treatment at 500° C. for 1 hour | after heat treatment at 700° C. for 50 hours |
| 1 | 0.0008 | 71% | 63% |
| 2 | 0.001 | 98% | 90% |
| 3 | 0.01 | 100% | 100% |
| 4 | 0.05 | 100% | 100% |
| 5 | 0.10 | 100% | 100% |
| 6 | 0.12 | 100% | 89% |
| 7 | 0.20 | 94% | 83% |

As is apparent from the above results, an optimum amount of the platinum is in the range of 0.001 to 0.1 wt%. When the amount exceeds 0.1 wt%, the dispersability of the catalyst becomes poor because of the excessive amount of the catalytic metal and aggregation is rather likely to occur, resulting in a lowering of performance.

In the table, test nos. 1, 6 and 7 are for reference.

When the above procedure was repeated using other platinum group metals, similar results were obtained. From this, an optimum amount of the platinum group metals is found to be in the range of 0.001 to 0.1 wt%.

EXAMPLE 5

The carrier of test No. 6 of Example 1 was used and deposited with a metal oxide. That is, the carrier was immersed in an aqueous 20 wt% $Mn(NO_3)_2$ solution, dried at 120° C. and heat treated at 500° C. for 1 hour to convert the manganese salt into a corresponding oxide. The amount of the deposition was controlled by repeating the cycle of the immersion and drying at 120° C.

The catalytic performance was evaluated similarly to Example 1 with the results shown in Table 3.

TABLE 3

| | | CO Purification Rate at 200° C. | |
|---|---|---|---|
| No. | Amount of deposited manganese oxide (wt %) | after heat treatment at 500° C. for 1 hour | after heat treatment at 700° C. for 50 hours |
| 1 | 0.08 | 68% | 48% |
| 2 | 0.10 | 84% | 65% |
| 3 | 0.23 | 86% | 68% |
| 4 | 3.24 | 88% | 74% |
| 5 | 8.32 | 90% | 84% |
| 6 | 10.0 | 93% | 80% |
| 7 | 12.5 | | Falling-off of manganese oxide |

As is apparent from the above results, an optimum amount of the metal oxide catalyst is in the range of 0.1 to 10 wt%. Less amounts lead to poor performance while larger amounts are unfavorable because of the falling-off of the oxide from the carrier.

In the table test Nos. 1 and 7 are shown for reference.

EXAMPLE 6

Example 5 was repeated using a 20 wt% $Cu(NO_3)_2$ solution instead of the $MN(ON_3)_2$ solution thereby depositing 5.7 wt% of copper oxide. The resulting catalyst had CO purification rates of 89% and 80% after the heat treatment 500° C. for 1 hour and at 700° C. for 50 hours, respectively.

EXAMPLE 7

The sample of test No. 5 of Example 5 was applied with the Pt salt solution of Example 4 so that the amount of Pt deposited was 0.05 wt% and then heat treated at 500° C. for 1 hour to obtain a catalyst. The thus obtained catalyst showed CO purification rates of 100% both after the heat treatment at 500° C. for 1 hour and after the heat treatment at 700° C. for 50 hours.

EXAMPLE 8

The carrier of test No. 5 of Example 1 was applied with mixed solutions of a $Pt(NH_3)_2(NO_2)_2$ aqueous solution and solutions of $PdCl_2$, $RuCl_3$ and $RhCl_3$ in mixing ratios indicated in Table 4, and then the procedure of Example 1 was repeated to obtain catalysts deposited with different catalytic compositions. Further, Pd alone was deposited on the carrier.

The test results are shown in Table 4 below.

TABLE 4

| | | | CO Purification Rate at 200° C. | |
|---|---|---|---|---|
| No. | Composition Ratio by Wt. | Amount of Deposition (wt %) | after heat treatment at 500° C. for 1 hour | after heat treatment at 700° C. for 50 hours |
| 1 | Pt + Pd 2:1 | 0.03 | 100% | 98% |
| 2 | Pt + Pd 3:1 | 0.08 | 100% | 100% |
| 3 | Pt + Ru 5:1 | 0.06 | 100% | 99% |
| 4 | Pt + Rh 5:1 | 0.08 | 100% | 98% |
| 5 | Pt + Pd + Ru 5:2:1 | 0.09 | 100% | 100% |
| 6 | Pd | 0.05 | 100% | 94% |

EXAMPLE 9

Calcium aluminate, manganese oxide ($\gamma$-$MnO_2$) and titanium oxide of the rutile structure were mixed in different ratios indicated in Table 5, to which was further added siliceous sand as a heat-resistant aggregate to give base compositions. Each base composition which had been dry mixed was admixed by a wet process with 30 to 40 parts by weight of water, 4 parts by weight of an alkali-resistant glass fiber and 0.5 parts by weight of methyl cellulose each based on 100 parts by weight of the base composition and press molded to obtain a disc of a honey-comb structure having a diameter of 154 mm and a thickness of 15 mm and provided with 745 throughholes with a diameter of 4.1 mm, followed by drying, aging in a water bath of 90° C. and drying to give a carrier sample.

The samples were each applied with a chloroplatinate solution having a concentration of 1 g/100 $ccH_2O$ in an amount of 70 mg (0.028 wt%) calculated as Pt, dried and thermally treated at 500° C. for 1 hour thereby depositing Pt on the sample.

The catalytic performances of these catalysts were evaluated by measuring their CO purification rate at 200° C. under conditions of a space velocity of 10,000 $hr^{-1}$ and a CO concentration of 300 ppm. The heat resistance of the samples was determined by comparing the CO purification rates after heating of the catalyst at 500° C. for 1 hour and after heating at 700° C. for 50 hours.

The test results are shown in Table 5 below.

TABLE 5

| | Composition (wt %) | | | | CO Purification Rate | |
|---|---|---|---|---|---|---|
| No. | alumina cement | $TiO_2$ | $\gamma$-$MnO_2$ | $SiO_2$ | after heating at 500° C. for 1 hour | after heating at 700° C. for 50 hours |
| 1 | 40 | — | 50 | 10 | 100% | 46% |
| 2 | 40 | 3 | 50 | 7 | 100% | 53% |
| 3 | 50 | 5 | 40 | 5 | 100% | 73% |
| 4 | 50 | 10 | 30 | 10 | 100% | 92% |
| 5 | 30 | 30 | 30 | 10 | 100% | 100% |
| 6 | 25 | 50 | 20 | 5 | 100% | 100% |
| 7 | 10 | 80 | 10 | — | Impossible to mold. | |

As is clearly seen from the above results, the effect of $TiO_2$ appears when the amount is in the range of 5 to 50 wt%. Larger amounts lead to a reduced amount of calcium aluminate serving as a binder, making it impossible to mold.

In the table, test Nos. 1, 2 and 7 are for reference.

REFERENCE

The sample Nos. 1-6 of Example prior to the deposition of Pt were subjected to the measurement of the CO purification rate with the results shown in Table 6.

TABLE 6

| No. | CO Purification Rate (200° C.) | |
|---|---|---|
| | after heating at 500° C. for 1 hour | after heating at 700° C. for 50 hours |
| 1 | 92% | 35% |
| 2 | 91% | 42% |
| 3 | 90% | 75% |
| 4 | 88% | 85% |
| 5 | 85% | 83% |
| 6 | 82% | 81% |

As is clear from the above results, sample Nos. 1 and 2 having larger contents of manganese dioxide show a better catalytic activity after the heat treatment at 500° C. for 1 hour but exhibit greater degrees of deterioration than sample Nos. 3 to 6 when treated at 700° C.

EXAMPLE 10

Example 9 was repeated using the composition of Nos. 6 in which $TiO_2$ was changed to that of the anatase type. The CO purification rate of the resulting catalyst was 100% after heating at 500° C. for 1 hour and 96% after heating at 700° C. for 50 hours.

EXAMPLE 11

Example 9 was repeated using the composition of No. 5 in which $TiO_2$ was replaced by compound oxides, i.e. $TiO_2$—$ZrO_2$, $TiO_2$—$SiO_2$ and $TiO_2$—$MgO$. The CO purification rates of these samples were 100% in all the cases after heating at 500° C. for 1 hour and were 98%, 100% and 100%, respectively, after heating at 700° C. for 50 hours.

EXAMPLE 12

In Example 9, instead of 30 wt% of $\gamma$-$MnO_2$ of the composition of No. 5 were used transition metal oxides shown in Table 7 thereby obtaining catalyst samples. Similarly to examples 9 and 10 the CO purification rates of the samples with or without depositing Pt were measured after heat treatments at 500° C. for 1 hour and at 700° C. for 50 hours. The measurement of the purification rate was conducted under conditions of a temperature of 200° C. and a space velocity of 10,000 $hr^{-1}$.

TABLE 7

| No. | Transition Metal Oxide | CO Purification Rate | | | |
|---|---|---|---|---|---|
| | | No deposition of Pt | | Pt deposited | |
| | | after heating at 500° C. for 1 hour | after heating at 700° C. for 50 hours | after heating at 500° C. for 1 hour | after heating at 700° C. for 50 hours |
| 1 | $MnFe_2O_4$ | 90% | 85% | 100% | 92% |
| 2 | CuO | 93% | 86% | 100% | 93% |
| 3 | $MnO_2$ + NiO (1:1) | 95% | 89% | 100% | 98% |
| 4 | $Co_2O_3$ + $Fe_2O_3$ (1:1) | 94% | 88% | 100% | 95% |
| 5 | $Co_2O_3$ + $Fe_2O_3$ (1:1) | 91% | 85% | 100% | 98% |
| 6 | $ZnFe_2O_4$ | 90% | 87% | 100% | 99% |
| 7 | $MnO_2$ + CuO (1:1) | 97% | 90% | 100% | 100% |

EXAMPLE 13

The carrier of the composition shown by No. 7 of Example 9 was used and the amount of Pt deposited on the carrier was varied and the CO purification rates were measured. A starting material for Pt was a solution of 1 g of $Pt(NH_3)_2(NO_2)_2$ in 100 cc of water and applied in such amounts (% by weight after drying) as indicated in Table 8. The performance was evaluated in the same manner as in Example 9.

TABLE 8

| No. | Deposited Amount of Pt (wt %) | CO Purification Rate at 200° C. | |
|---|---|---|---|
| | | after heating at 500° C. for 1 hour | after heating at 700° C. for 50 hours |
| 1 | 0.0008 | 71% | 63% |
| 2 | 0.001 | 98% | 90% |
| 3 | 0.01 | 100% | 100% |
| 4 | 0.05 | 100% | 100% |
| 5 | 0.10 | 100% | 100% |
| 6 | 0.12 | 100% | 89% |
| 7 | 0.20 | 94% | 83% |

As is apparent from the above results, in this case an optimum amount of the metal catalyst supported on the carrier is in the range of 0.001 to 0.10 wt%. Larger amounts result in poor dispersability because the amount of Pt is in excess and show a tendency for aggregation, lowering the catalytic performance. In the table test Nos. 1, 6 and 7 are for reference.

EXAMPLE 14

The carrier of test No. 5 of Example 9 was used and supported with various types of platinum group metals using mixtures of an aqueous solution of $Pt(NH_3)(NO_2)_2$ and solutions of $PdCl_2$, $RuCl_3$ and/or $RhCl_3$. The CO purification rates of these catalysts are shown in Table 9.

TABLE 9

| No. | Composition Ratio | Amount of Deposition (wt %) | CO Purification Rate at 200° C. | |
|---|---|---|---|---|
| | | | after heating at 500° C. for 1 hour | after heating at 700° C. for 50 hours |
| 1 | Pt + Pd 2:1 | 0.03 | 100% | 98% |
| 2 | Pt + Pd 3:1 | 0.08 | 100% | 100% |
| 3 | Pt + Ru 5:1 | 0.06 | 100% | 99% |
| 4 | Pt + Rh 5:1 | 0.08 | 100% | 98% |
| 5 | Pt + Pd + Ru 5:2:1 | 0.09 | 100% | 100% |

TABLE 9-continued

| No. | Composition Ratio | Amount of Deposition (wt %) | CO Purification Rate at 200° C. after heating at 500° C. for 1 hour | after heating at 700° C. for 50 hours |
|---|---|---|---|---|
| 6 | Pd | 0.05 | 100% | 94% |

EXAMPLE 15

One hundred parts by weight of a mixture of 50 wt% of calcium aluminate and 50 wt% of siliceous stone were admixed with 4 parts by weight of an alkali-resistant glass fiber, and 25 parts by weight of water. The mixture was press molded into a disc having a diameter of 154 mm and a thickness of 15 mm and provided with 745 throughholes having a diameter of 4.1 mm. After drying, the disc sample was aged in a water bath of 90° C. for 1 hour and then dried at 120° C. for 1 hour.

The resulting solid mass was applied with a slurry of rutile type $TiO_2$ in different ratios, dried and heated at 600PC for 1 hour to obtain a carrier.

Each carrier was applied with an aqueous solution of chloroplatinate having a concentration of 1 g/100 cc in an amount of 70 mg (0.028 wt%) calculated as Pt, dried and heat treated at 500° C. for 1 hour to deposit Pt on the carrier.

The CO purification rate of the catalysts at 200° C. was measured under conditions of a space velocity of 10,000 hr$^{-1}$ and a CO concentration of 300 ppm. The heat resistance of the samples was determined by comparing the catalytic performances measured after heating at 500° C. for 1 hour and after heating at 700° C. for 50 hours. The results are shown in Table 10.

TABLE 10

| No. | Deposited Amount of $TiO_2$ (wt %) | Deposited State of $TiO_2$ | CO Purification Rate at 200° C. after heating at 500° C. for 1 hour | after heating at 700° C. for 50 hours |
|---|---|---|---|---|
| 1 | 0.03 | o | 100% | 73% |
| 2 | 0.05 | o | 100% | 90% |
| 3 | 0.12 | o | 100% | 93% |
| 4 | 3.2 | o | 100% | 94% |
| 5 | 5.3 | o | 100% | 97% |
| 6 | 6.7 | o | 100% | 100% |
| 7 | 8.4 | o | 100% | 100% |
| 8 | 10.0 | Δ | 100% | 100% |
| 9 | 10.2 | x | — | — |

In the table, the deposited state of $TiO_2$ is evaluated as follows: When the carrier was rubbed by fingers, the case where no $TiO_2$ is attached to the fingers is indicated as "o", the case where a slight degree of the attachment is observed is indicated as "Δ", and the case where a fair degree of the attachment is observed and $TiO_2$ has fallen off from the carrier is indicated as "x".

As is clearly seen from the table, an optimum amount of deposition of the $TiO_2$ layer is in the range of 0.05 to 10 wt% based on the solid mass. Within the above range, little or no deterioration in performance is observed even after heating of the catalysts at 700° C. for 50 hours. When the amount exceeds 10 wt%, the falling off of $TiO_2$ undesirably takes place, making it impossible to use such a carrier.

It will be noted that test Nos. 1 and 9 are for reference.

EXAMPLE 16

The solid mass containing calcium aluminate as used in Example 15 was immersed in a 10 wt% $TiSO_4$ solution and heated at 700° C. for 1 hour to deposit a $TiO_2$ layer on the surface of the solid mass. The deposited amount of $TiO_2$ was 3.5%. The resulting carrier was treated in the same manner as in Example 15 to deposit Pt thereon. The CO purification rate of the catalyst was 100% after heating at 500° C. for 1 hour and 98% after heating at 700° C. for 50 hours.

EXAMPLE 17

Example 16 was repeated using a 10 wt% $(NH)_2TiCl_6.2H_2O$ solution to deposit $TiO_2$ in an amount of 4.2 wt% after the heat treatment. Then, the procedure of Example 16 was repeated to obtain a catalyst showing a CO purification rate of 100% after heating at 500° C. for 1 hour and 96% after heating at 700° C. for 50 hours.

EXAMPLE 18

Example 16 was repeated using a 10 wt% titanium lactate $(Ti(C_3H_5O_3)_4)$ to deposit $TiO_2$ in an amount of 5.4 wt% after the heat treatment. Then, the procedure of Example 16 was repeated to obtain a catalyst showing a CO purification rate of 100% after heating at 500° C. for 1 hour and 97% after heating at 700° C. for 50 hours.

EXAMPLE 19

The carrier of the composition indicated by test No. 5 of Example 1 was deposited with platinum in different amounts to give catalysts. A starting material for platinum used was $Pt(NH_3)_2(NO_2)_2$ and was dissolved in water at a concentration of 1 g/100 cc. Then, the solution was applied so that the amount of the deposited platinum was as indicated in Table 11 below. The catalytic performance of these catalysts was evaluated in the same manner as in Example 15.

TABLE 11

| No. | Amount of Deposited Pt (wt %) | CO Purification Rate at 200° C. after heating at 500° C. for 1 hour | after heating at 700° C. for 50 hours |
|---|---|---|---|
| 1 | 0.0008 | 71% | 63% |
| 2 | 0.001 | 98% | 90% |
| 3 | 0.01 | 100% | 100% |
| 4 | 0.05 | 100% | 100% |
| 5 | 0.10 | 100% | 100% |
| 6 | 0.12 | 100% | 89% |
| 7 | 0.20 | 94% | 83% |

As is clearly seen from the above results, an optimum amount of the metal catalyst is also found to be in the range of 0.001 to 0.1 wt%. When the amount exceeds 0.1 wt%, the catalytic metal is so large in amount that its dispersability becomes poor and the metal is rather likely to aggregate, showing a lowering of the catalytic performance.

EXAMPLE 20

The carrier of test No. 6 of Example 15 was used for deposition with a metal oxide. That is, the carrier was immersed in a 20 wt% solution of $Mn(NO_3)_2$, dried at 120° C. and heat treated at 500° C. for 1 hour to convert the manganese salt into a corresponding oxide. The deposited amount was controlled by repeating the procedure of the immersion and the drying at 120° C. The catalytic performance was evaluated in the same manner as in Example 15. The results are shown in Table 12.

TABLE 12

| No. | Deposited Amount of Pt (wt %) | CO Purification Rate at 200° C. | |
|---|---|---|---|
| | | after heating at 500° C. for 1 hour | after heating at 700° C. for 50 hours |
| 1 | 0.08 | 68% | 48% |
| 2 | 0.10 | 84% | 65% |
| 3 | 0.23 | 86% | 68% |
| 4 | 3.24 | 88% | 74% |
| 5 | 8.32 | 90% | 84% |
| 6 | 10.0 | 93% | 80% |
| 7 | 12.5 | falling-off of manganese oxide | |

It will be noted that, in the foregoing examples, the catalytic performance of catalysts is evaluated by virtue of CO purification rate but a similar tendency is observed when hydrocarbons are used instead of CO.

As seen from the foregoing examples, there can be obtained according to the invention catalysts which are excellent in heat resistance and catalyst life. This is considered to result from the addition of $TiO_2$ as one component of the carrier. In addition, a major proportion of the catalyst of the invention is constituted of inexpensive materials, i.e. calcium aluminate and titanium oxide, so that the catalyst can be manufactured inexpensively.

What is claimed is:

1. A catalyst for purifying an exhaust gas which comprises a carrier substantially composed of calcium aluminate and 5 to 90 wt% of titanium oxide based on the amount of carrier, and a catalytic component of a platinum group metal, or a metal oxide capable of oxidizing reductive gases into innoxious ones, and supported on said carrier when said platinum group metal is used, and in an amount of 0.1 to 10 wt% when said metal oxide is used.

2. A catalyst according to claim 1, wherein said carrier is made of a solid mass of calcium aluminate and a titanium oxide layer formed on part or all of the surface of said mass, the amount of the titanium oxide being in the range of 0.05 to 10 wt% of said solid mass.

3. A catalyst according to any one of claims 1 through 2, wherein said titanium oxide is $TiO_2$ of an anatase or rutile structure.

4. A catalyst according to any one of claims 1 through 2, wherein said titanium oxide is a compound oxide containing titanium oxide.

5. A catalyst according to claim 1, wherein said catalytic component is a mixture of the platinum group metal and the metal oxide and is used in an amount of 0.1 to 10 wt% of said carrier provided that said platinum group metal is used in an amount of 0.001 to 0.1 wt% of the carrier.

6. A catalyst according to claim 1 or 5, wherein said platinum group metal is Pt, Ru, Rh, Pd, Ir or a mixture thereof.

7. A catalyst according to claim 6, wherein said platinum group metal is platinum.

8. A catalyst according to claim 1 or 5, wherein said metal oxide is an oxide of Fe, Co, Ni, Cr, Mo, Sn, Pb, Mn, Cu, Ag, La, Zn, Cd, V or a mixture thereof.

9. A catalyst according to claim 1, wherein said carrier further comprises alumina aggregate, alumina-silica aggregate, silica aggregate or a mixture thereof.

10. A catalyst according to claim 1, wherein said carrier further comprises an alkali-resistant glass fiber, fibrous iron wire, asbestos or a mixture thereof.

11. A catalyst according to claim 1, wherein said carrier further comprises a molding aid to facilitate the molding of the carrier.

12. A catalyst according to claim 1, wherein said carrier comprises a mixture of 10 to 70 wt% of calcium aluminate, 5 to 50 wt% of titanium oxide, and 5 to 70 wt% of a transition metal oxide.

13. A catalyst according to claim 12, wherein said transition metal oxide is an oxide of Mn, Co, Ni, Cr, Cu, or Fe.

14. A catalyst according to claim 12 or 13, wherein said transition metal oxide is $\gamma$-$MnO_2$.

15. A catalyst according to claim 12, wherein said transition metal oxide is a compound oxide.

16. A method for manufacturing a catalyst for purifying an exhaust gas which comprises the steps of providing a mass of calcium aluminate, applying a slurry of titanium oxide or a solution of a titanium compound on said mass, thermally treating the thus applied mass at temperatures above 500° C. to form a titanium oxide layer on part or all of the surface of said mass thereby obtaining a carrier, and depositing on said carrier a catalytic component of a platinum group metal or a metal oxide capable of oxidizing reductive gases into innoxious ones in an amount of 0.001 to 0.1 wt% based on said carrier when the metal is used and in an amount of 0.1 to 10 wt% when the metal oxide is used.

17. A method according to claim 16, wherein the titanium oxide is applied in an amount of 0.05 to 10 wt% of said mass.

18. A method according to claim 16, wherein the titanium compound is $TiOSO_4$ or $(NH)_2TiCl_6.2H_2O$.

* * * * *